United States Patent
Murthy et al.

(10) Patent No.: US 9,367,129 B1
(45) Date of Patent: Jun. 14, 2016

(54) METHOD AND SYSTEM FOR CONTROLLING DISPLAY OF CONTENT TO USER

(71) Applicants: Manjunatha Murthy, Bangalore (IN); Aswath Fazil Khan Sabudeen, Bangalore (IN)

(72) Inventors: Manjunatha Murthy, Bangalore (IN); Aswath Fazil Khan Sabudeen, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 14/663,922

(22) Filed: Mar. 20, 2015

(30) Foreign Application Priority Data

Feb. 5, 2015 (IN) .............................. 569/CHE/2015

(51) Int. Cl.
*G06K 19/00* (2006.01)
*G06F 3/01* (2006.01)
*G06K 9/00* (2006.01)
*H04N 5/232* (2006.01)

(52) U.S. Cl.
CPC ............ *G06F 3/013* (2013.01); *G06K 9/00604* (2013.01); *H04N 5/23219* (2013.01); *G06F 2203/04806* (2013.01)

(58) Field of Classification Search
USPC ................................. 235/435, 439, 454, 472
See application file for complete search history.

(56) References Cited

U.S. PATENT DOCUMENTS

| | | | |
|---|---|---|---|
| 8,482,562 B2 | 7/2013 | Contractor et al. | |
| 8,619,095 B2 | 12/2013 | Jaramillo et al. | |
| 8,638,344 B2 | 1/2014 | Jaramillo et al. | |
| 2010/0141608 A1 | 6/2010 | Huang et al. | |
| 2011/0149059 A1* | 6/2011 | Alberth .................. G06F 3/011 348/77 |
| 2011/0157180 A1 | 6/2011 | Burger et al. | |
| 2011/0299168 A1 | 12/2011 | Combs | |
| 2012/0254779 A1* | 10/2012 | Ollivierre ............. A61B 3/0041 715/764 |
| 2012/0262477 A1 | 10/2012 | Buchheit | |
| 2013/0093796 A1 | 4/2013 | Lee | |

FOREIGN PATENT DOCUMENTS

| | | |
|---|---|---|
| WO | WO 2013131418 | 9/2013 |
| WO | WO 2014070494 | 5/2014 |

* cited by examiner

*Primary Examiner* — Matthew Mikels
(74) *Attorney, Agent, or Firm* — Finnegan, Henderson, Farabow, Garrett & Dunner, L.L.P.

(57) ABSTRACT

The present disclosure relates to a method and a system for controlling display of content to user. In one embodiment, an input image of the user is captured and processed to detect the presence of spectacles in the input image. On detecting the absence of spectacles, the content available for display is processed to identify readable and non-readable content and refractive error correction factor for the non-readable content is determined. Based on the determined refractive error correction factor, the display of both the readable and non-readable content is controlled and the content is displayed.

12 Claims, 4 Drawing Sheets

METHOD AND SYSTEM FOR CONTROLLING DISPLAY OF CONTENT TO USER

CROSS-REFERENCE TO RELATED APPLICATIONS

This U.S. patent application claims priority under 35 U.S.C. §119 to: Indian Patent Application No. 569/CHE/2015, filed Feb. 5, 2015. The aforementioned application is incorporated herein by reference in its entirety.

TECHNICAL FIELD

The present subject matter is related, in general to personalized electronic displays, and more particularly, but not exclusively to method and system for controlling display of content to users.

BACKGROUND

Generally users of devices with electronic visual displays suffer from Presbyopia, due to error in their vision and wear spectacles with error corrected lenses when reading text or viewing images at close range. However, these glasses are worn intermittently and if a user unexpectedly needs to view an electronic visual display, reading glasses may not be conveniently available or the user may forget to wear it.

Typical content displayed in electronic visual displays comprises combination of text and or images with different sizes. A particular portion of the content may be readable at a particular level of vision-defect, however another portion of the content may not be readable. A user has to manually alter the size of text or images and adjust the display to address his/her reading difficulties, which is burdensome. Therefore, there is a need for method and device for controlling display of content based on refractive power capabilities of the users eliminating the need of wearing vision-correction articles by the users.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Accordingly, the present disclosure relates to a method of controlling display of content to user. The method comprises the steps of capturing an input image of the user by an image sensor of a display controlling device and detecting the presence of spectacles in the captured input image. Upon detecting the presence of spectacles, one or more readable and non-readable content available for display is identified and refractive error correction factor for each of the non-readable content is determined. Based on at least the refractive error correction factor thus determined, display of the content is controlled.

Further, the present disclosure relates to a system for controlling display of content to user. The system comprises an image sensor for capturing an input image of the user. The system further comprises a processor and a memory communicatively coupled to the processor, wherein the memory stores processor-executable instructions, which, on execution, cause the processor to detect the presence of spectacles in the input image of the user. The processor is furthermore configured to identify one or more readable and non-readable content available for display and determine refractive error correction factor for each of the non-readable content. Based on at least the refractive error correction factor thus determined, the processor controls the display of the content.

Furthermore, the present disclosure relates to a non-transitory computer readable medium including instructions stored thereon that when processed by at least one processor cause a system to perform the act of capturing an input image of the user. Further, the instructions cause the processor to detect the presence of spectacles in the input image of the user and identify one or more readable and non-readable content available for display. Upon identifying, the instructions cause the processor to determine refractive error correction factor for each of the non-readable content and control the display of the content based on at least the refractive error correction factor thus determined.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
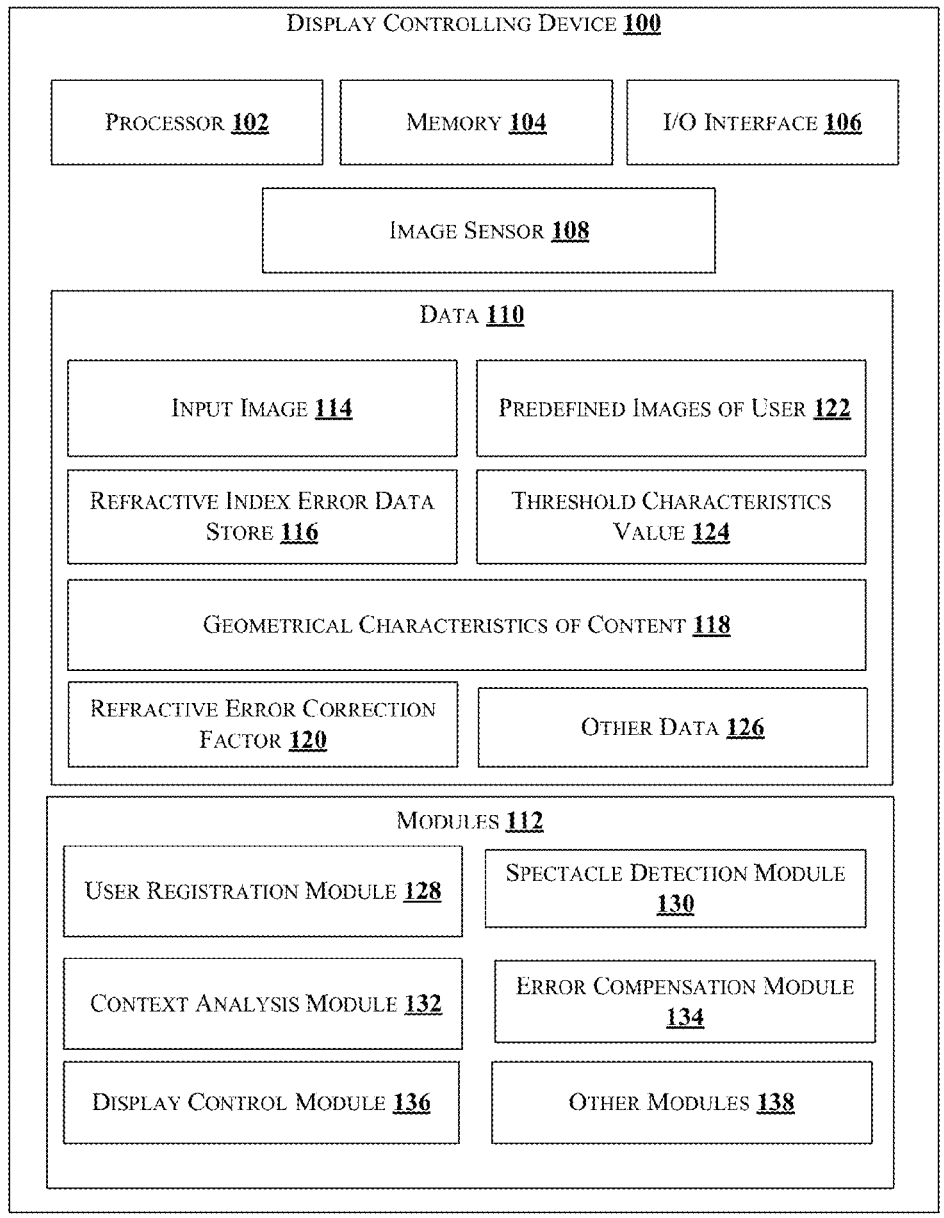
FIG. 1 illustrates a block diagram of an exemplary display controlling system for controlling display of content to user in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

The present disclosure relates to a method and a system for controlling display of content to user. In one embodiment, an input image of the user is captured and processed to detect the presence of spectacles in the input image. On detecting the absence of spectacles, the content available for display is processed to identify readable and non-readable content and refractive error correction factor for the non-readable content is determined. Based on the determined refractive error correction factor, the display of both the readable and non-readable content is controlled and the content is displayed.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates a block diagram of an exemplary display controlling device 100 for controlling display of content to user in accordance with some embodiments of the present disclosure;

The display controlling system 100 (hereinafter referred to as system 100) comprises one or more components configured to control the display of the content to users. In one embodiment, the exemplary system 100 includes a central processing unit ("CPU" or "processor") 102, the memory 104 and an I/O interface 106. The I/O interface 106 is coupled with the processor 102 and an I/O device. The I/O device is configured to receive inputs via the I/O interface 106 and transmit outputs for displaying in the I/O device via the I/O interface 106.

The system 100 also comprises an image sensor 108A for capturing image of the user as input to identify the user and alter the geometry of the content for display to the user according to the vision defect of the identified user. In one embodiment, the image sensor 108A may be for example, integrated camera that is integrated with the system 100. In another embodiment, the image sensor 108A may be for example web cam, camera, or any image capturing device that is externally coupled with the system 100. Furthermore, the system 100 comprises a display unit 108B coupled with the image sensor 108A for displaying the content to the user.

The system 100 further comprises data 110 and modules 112. In one implementation, the data 110 and the modules 112 may be stored within the memory 104. In one example, the data 110 may include input image of user 114, refractive index error data store 116, and geometrical characteristics of content 118, refractive error correction factor 120, and training images of user 122, threshold characteristics value 124 and other data 126. In one embodiment, the data 110 may be stored in the memory 104 in the form of various data structures. Additionally, the aforementioned data can be organized using data models, such as relational or hierarchical data models. The other data 126 may be also referred to as reference repository for storing recommended implementation approaches as reference data. The other data 126 may also store data, including temporary data and temporary files, generated by the modules 112 for performing the various functions of the system 100.

The modules 112 may include, for example, the user registration module 128, spectacle detection module 130, context analysis module 132, error compensation module 134, and display control module 136. The modules 112 may also comprise other modules 138 to perform various miscellaneous functionalities of the device 100. It will be appreciated that such aforementioned modules may be represented as a single module or a combination of different modules. The modules 112 may be implemented in the form of software, hardware and or firmware.

In one implementation, the user registration module 128 creates one or more profiles of users capable of using the device 100. In one embodiment, the user registration module 128 receives one or more images of the user captured by the image sensor 108 and stores the captured images in the memory 104 as predefined images of the user 122. One or more captured images of the user for example, include a first image of the user without wearing spectacles, and a second image of the user with spectacles. The user registration module 128 creates a profile for each user, generates a unique a profile identification (ID) number for each user profile and stores the predefined images 122 corresponding to the profile ID of the user in the memory 104. The user registration module 128 also receives and stores refractive index error value with corrected vision and radii of curvature of one or more users in the refractive index error data store 116.

In operation, the input image 114 of the user is captured by the image sensor 108 and pre-processed by the processor 102 to determine the authenticity of the user. In one example, the processor 102 pre-processes the received input image 114 and detects the face image of the user from the pre-processed input image 114. The face image of the user may be detected using facial recognition algorithms known in the art. Upon determining the face image, the processor 102 compares the face image of the user with at least one of the predefined images 122 for example, the first image of the user stored in the memory 104. If the face image of the user matches with at least one of the predefined images 122 of each user, it is determined that the user is a registered user and the spectacle detection module 130 proceeds to detect the presence of spectacles in the input image 114 of the user. If the face image of the user matches with none of the predefined images 122, then the user is determined to be an unregistered user and the content is displayed without any modification or alteration in the characteristic of the content.

Upon determination of user to be registered user, the spectacle detection module 130 detects the presence of spectacles by comparing the input image 114 with at least one of the predefined images 122 for example, the second image of one or more users wearing spectacles already stored in the memory 104. The presence or absence of the spectacles is detected and the output of the detection is sent as input to the context analysis module 132. For example, if the presence of the spectacles is not detected by the spectacle detection module 130, the output indicating the absence of spectacles is transmitted as input to the context analysis module 132. On the other hand, if the presence of the spectacles is detected, then the content is displayed as is by the processor 102.

The context analysis module 132 analyses the content to be displayed suitable for the user's vision once the absence of the spectacles input is received. In one embodiment, the content to be displayed is classified into readable and non-readable content. For example, the content is classified into one or more groups or sub-contents including at least text, image and icons etc. For each group, one or more geometrical characteristics 118 like size, width, length and so on are determined. In one implementation, the context analysis module 132 determines the size of fonts in each text group, width and length for each image and icon groups. Upon determining, the geometrical characteristics of each group 118 are compared with a predetermined threshold characteristic value 124 to identify the readability of the group. The threshold characteristic value 124 is determined based at least on the stored refractive index, and radii of curvature of the user. In one example, the threshold value is determined using inverse of lens man formula. If the geometrical characteristic 118 of a group is determined to be lesser than the predetermined threshold characteristic value 124, then the group of the content is classified as non-readable, otherwise the group is classified as readable. A list of readable and non-readable groups of the content is stored in the memory. For example, a hash table comprising the list of groups is created and mapped with analysis output "readable" or "non-readable". For example, see below table A.

TABLE A

| text with font size 10 | Readable |
| image size 2 × 2 mm | Not Readable |

Upon identifying the non-readable content, the error compensation module 134 determines appropriate refractive error correction factor 120 to compensate the user's vision thereby improving the readability of the non-readable content. In one embodiment, the error compensation module 134 determines the actual geometrical characteristics 118 for example actual size of each group using known lens maker formula and calculates the difference between the actual size and the pre-determined threshold characteristic value to determine refractive error compensation factor 120 or the resizing factor. Based on the refractive error compensation factor 120 thus determined, the error compensation module 134 enable the resizing of the content without altering or losing the information or aspect ratio of the content of each group. Upon resizing the content, the error compensation module 134 determines a new content comprising the readable content and the resized content.

The display control module 136 renders the display of the re-sized content based on the error compensation factor 120 thus determined. In one implementation, the display control module 136 determines the size of the display window, child/pop-up windows based on the error compensation factor 120 of each group and controls the display of scroll bars etc. Upon resizing the window size, the new content is displayed by the display control module 136 via the display unit 108B. In case, if the user wears the spectacles and the spectacle detection module 130 detects the presence of spectacles, then the display control module 136 automatically switches to the original mode of display and renders the content as is. Thus, the display controlling device 100 enables faster rendering of the content for display based on spectacle detection and selectively altering or resizing the content.

Figure 2:
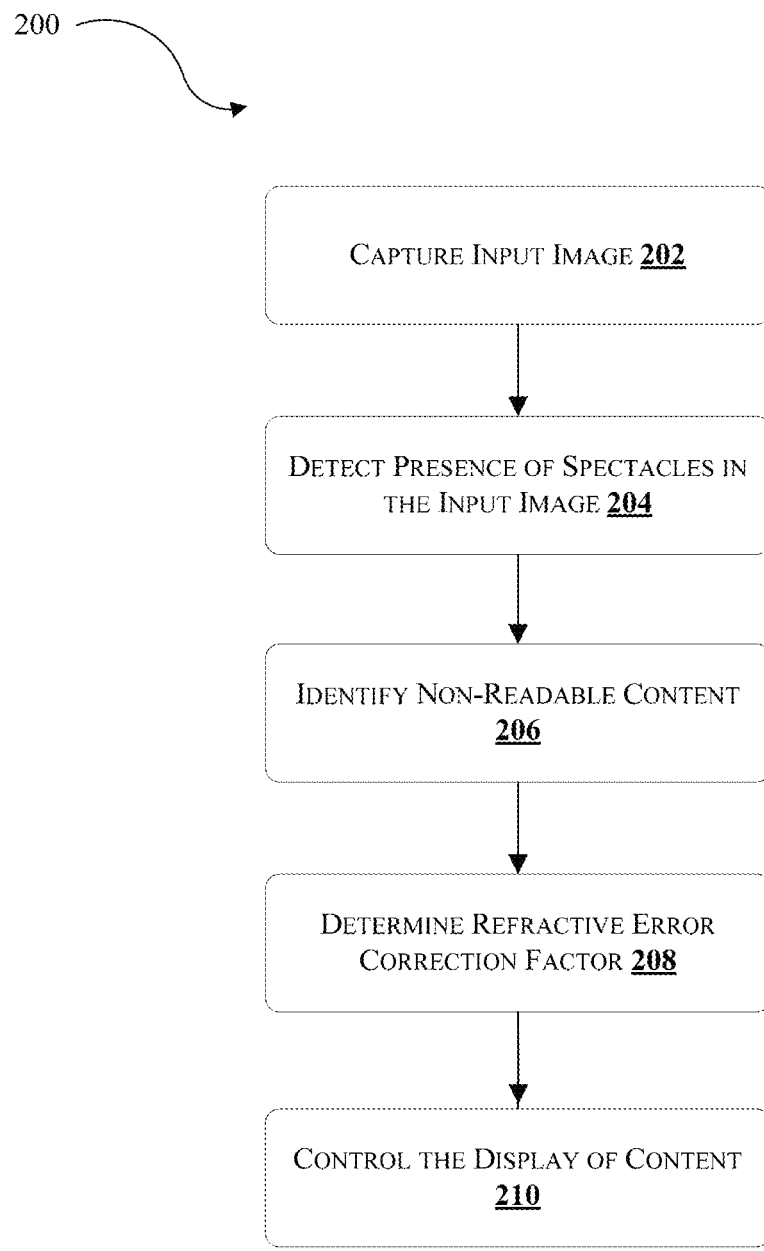
FIG. 2 illustrates a flowchart of an exemplary method of controlling display of content to user in accordance with some embodiments of the present disclosure.

FIG. 2 illustrates a flowchart of method of identifying areas of improvements in an enterprise application in accordance with an embodiment of the present disclosure.

As illustrated in FIG. 2, the method 200 comprises one or more blocks implemented by the processor 102 of the display controlling device 100 for controlling display of content to user. The method 200 may be described in the general context of computer executable instructions. Generally, computer executable instructions can include routines, programs, objects, components, data structures, procedures, modules, and functions, which perform particular functions or implement particular abstract data types.

The order in which the method 200 is described is not intended to be construed as a limitation, and any number of the described method blocks can be combined in any order to implement the method 200. Additionally, individual blocks may be deleted from the method 200 without departing from the spirit and scope of the subject matter described herein. Furthermore, the method 200 can be implemented in any suitable hardware, software, firmware, or combination thereof.

At block 202, capture input image. In one embodiment, the input image 114 of the user is captured by the image sensor 108 and pre-processed by the processor 102 to determine the authenticity of the user. In one example, the processor 102 pre-processes the received input image 114 and detects the face image of the user from the pre-processed input image 114. The face image of the user may be detected using facial recognition algorithms known in the art. Upon determining the face image, the processor 102 compares the face image of the user with at least one of the predefined images 122 for example, the first image of the user stored in the memory 104. If the face image of the user matches with at least one of the predefined images 122 of each user, it is determined that the user is a registered user and the spectacle detection module 130 proceeds to detect the presence of spectacles in the input image 114 of the user. If the face image of the user matches with none of the predefined images 122, then the user is determined to be an unregistered user and the content is displayed without any modification or alteration in the characteristic of the content.

At block 204, detect presence of spectacles in the input image. In one embodiment, the spectacle detection module 130 detects the presence of spectacles by comparing the input image 114 with at least one of the predefined images 122 for example, the second image of one or more users wearing spectacles already stored in the memory 104. The presence or absence of the spectacles is detected and the output of the detection is sent as input to the context analysis module 132. For example, if the presence of the spectacles is not detected by the spectacle detection module 130, the output indicating the absence of spectacles is transmitted as input to the context analysis module 132. On the other hand, if the presence of the spectacles is detected, then the content is displayed as is by the processor 102.

Figure 3A:
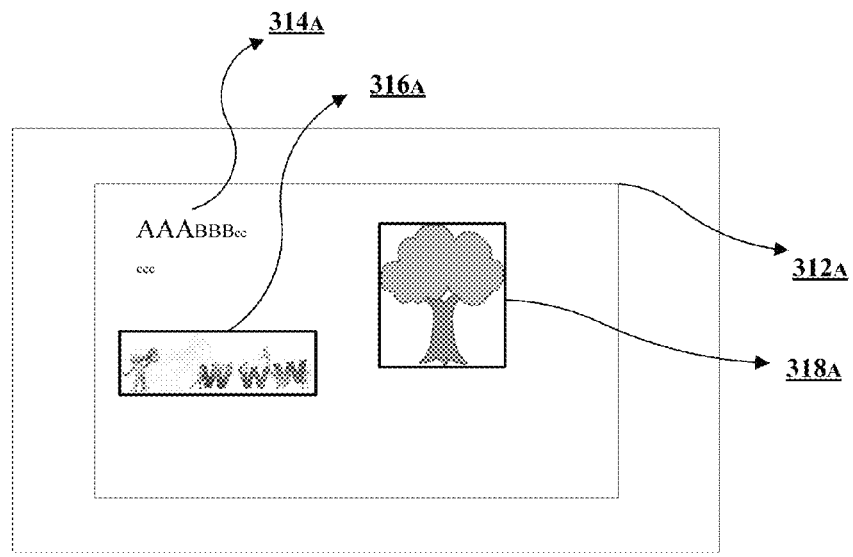
FIGS. 3*a* & 3*b* illustrate exemplary display of content before and after resizing in accordance with some embodiments of the present disclosure.

At block 206, identify non-readable content. In one embodiment, the context analysis module 132 analyses the content to be displayed suitable for the user's vision once the absence of the spectacles is detected. Let us consider an example content displayed by the display unit 108B within a window 312A having a predetermined size is shown in FIG. 3a. The context analysis module 132 classifies the content to be displayed into readable and non-readable content. For example, the content is classified into one or more groups including at least text, image and icons etc. As shown in FIG. 3a, the content is classified into text group 314A, and one or more image group 316A and 318A. For each group, one or more geometrical characteristics 118 like size of text, width, length of image groups are determined.

In one implementation, the context analysis module 132 determines the size of fonts in each text group 314A, width and length for each image and icon groups 316A and 318A. Upon determining, the geometrical characteristics of each group 118 are compared with a predetermined threshold characteristic value 124 to identify the readability of the group. The threshold characteristic value 124 is determined based at least on the stored refractive index, and radii of curvature of the user. In one example, the threshold value is determined using inverse of lens man formula. If the geometrical characteristic 118 of a group is determined to be lesser than the predetermined threshold characteristic value 124, then the group of the content is classified as non-readable, otherwise the group is classified as readable. As illustrated in FIG. 3a, the text group 314A and the image group 316A is classified as non-readable and the image group 318A is classified as readable.

At block 208, determine refractive error correction factor. In one embodiment, the error compensation module 134 determines appropriate refractive error correction factor 120 to compensate the user's vision thereby improving the readability of the non-readable content. In one embodiment, the error compensation module 134 determines the actual geometrical characteristics 118 for example actual size of each group using known lens maker formula and calculates the difference between the actual size and the predetermined threshold characteristic value to determine refractive error compensation factor 120 or the resizing factor.

Figure 3B:
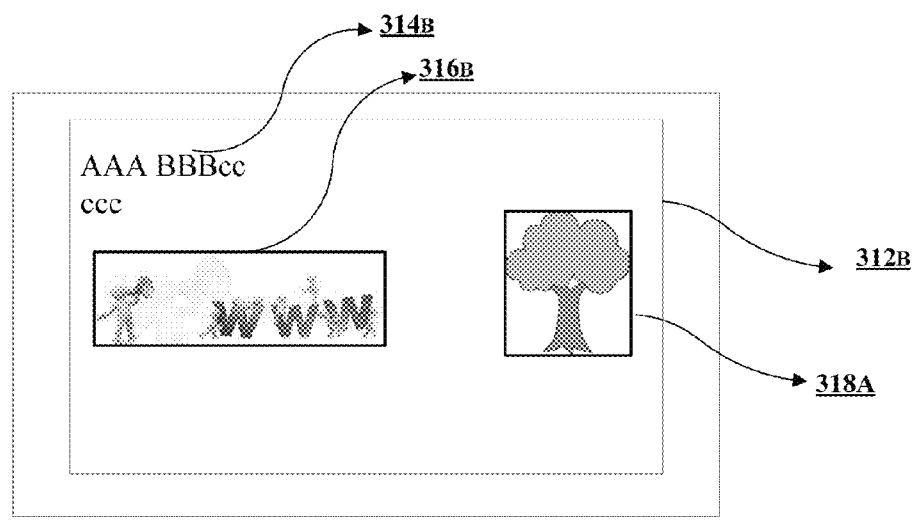

Based on the refractive error compensation factor 120 thus determined, the error compensation module 134 enable the resizing of the content without altering or losing the information or aspect ratio of the content of each group. For example, as illustrated in FIG. 3b, the font size of the text group 314A is increased based on the resizing factor displaying the resized text group 314B. Also, the size of image group 316A has been increased to display the resized image group 316B. Upon resizing the content, the error compensation module 134 determines a new content comprising the readable content and the resized content. In one example, the error compensation module 134 combines the readable content i.e., image group 318A with the resized content i.e., text group 314B and image group 316B into a new content.

At block 210, control the display of content. In one embodiment, the display control module 136 renders the display of the re-sized content based on the error compensation factor 120 thus determined. In one implementation, the display control module 136 determines the size of the display window, child/pop-up windows based on the error compensation factor 120 of each group and controls the display of scroll bars etc. For example, as illustrated in FIG. 3B, the size of the window 312A is now altered to a resized window 312B.

Upon resizing the window size, the new content is displayed by the display control module 136 via the display unit 108B. In case, if the user wears the spectacles and the spectacle detection module 130 detects the presence of spectacles, then the display control module 136 automatically switches to the original mode of display and renders the content as is. Thus, the display controlling device 100 enables faster rendering of the content for display based on spectacle detection and selectively altering or resizing the content.

Figure 4:
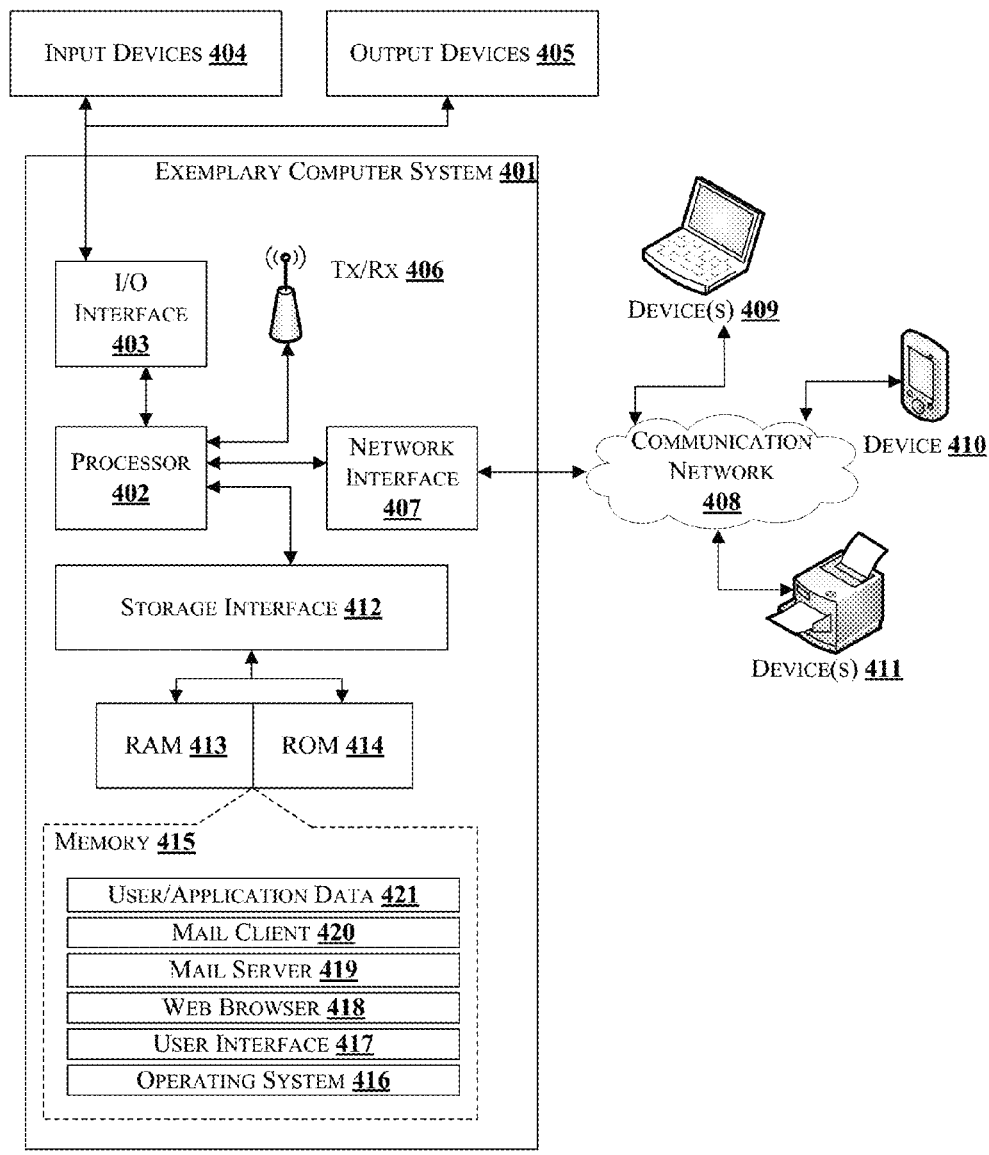
FIG. 4 is a block diagram of an exemplary computer system for implementing embodiments consistent with the present disclosure.

FIG. 4 is a block diagram of an exemplary computer system for implementing embodiments consistent with the present disclosure.

Variations of computer system 401 may be used for implementing all the computing systems that may be utilized to implement the features of the present disclosure. Computer system 401 may comprise a central processing unit ("CPU" or "processor") 402. Processor 402 may comprise at least one data processor for executing program components for executing user- or system-generated requests. The processor may include specialized processing units such as integrated system (bus) controllers, memory management control units, floating point units, graphics processing units, digital signal processing units, etc. The processor 402 may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface 407 may employ connection protocols including, without limitation, direct connect, Ethernet (e.g., twisted pair 10/40/400 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409, 410, and 411. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 4Error! Reference source not found.14, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 415 may store a collection of program or database components, including, without limitation, an operating system 4Error! Reference source not found.16, user interface application 4Error! Reference source not found.17, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 301 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As described above, the modules 112, amongst other things, include routines, programs, objects, components, and data structures, which perform particular tasks or implement particular abstract data types. The modules 112 may also be implemented as, signal processor(s), state machine(s), logic circuitries, and/or any other device or component that manipulate signals based on operational instructions. Further, the modules 112 can be implemented by one or more hardware components, by computer-readable instructions executed by a processing unit, or by a combination thereof.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein.

The term "computer-readable medium" should be understood to include tangible items and exclude carrier waves and transient signals, i.e., are non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. A method for controlling display of content on a display controlling system comprising a display unit to user, the method comprising:
   capturing, by an image sensor associated with the display controlling system, an input image of the user;
   detecting, by a processor of the display controlling system, presence of spectacles in the input image of the user;
   identifying, by the processor, one or more readable and non-readable content available for display upon detection, the identifying comprises;
      classifying the content into one or more groups including text, images and icons:
      determining one or more geometrical characteristics of each group;
      comparing the one or more geometrical characteristics of each group with a predetermined threshold characteristic value, wherein the predetermined threshold characteristic value is based at least on the stored refractive index, and radii of curvature of the user; and
      identifying one or more readable and non-readable group of the content based on the comparison;
   determining, by the processor, refractive error correction factor for each of the non-readable content upon the identifying; and
   controlling, by the processor, display of the content on the display unit based on at least the refractive error correction factor thus determined.

2. The method as claimed in claim 1, wherein the presence of spectacles in the input image of the user is detected by comparing the input image of the user with the previously stored images of the user.

3. The method as claimed in claim 1, wherein the refractive error correction factor for non-readable content is determined by the steps of:
   calculating the difference between the one or more geometrical characteristics of each group of non-readable content with the predetermined threshold characteristics value;
   determining the refractive error correction factor for each group of non-readable content based on the calculated difference.

4. The method as claimed in claim 1, wherein controlling the display of the content comprising the steps of:
   modifying the geometrical characteristics of each group of non-readable content based on the corresponding refractive error correction factor to generate one or more resized groups of non-readable content; and
   displaying the readable content and resized group of non-readable content to the user.

5. A display controlling system for controlling display of content to a user, the system comprising:
   an image sensor for capturing an input image of the user;
   a display unit coupled with image sensor;
   a processor coupled with the image sensor and the display unit; and
   a memory communicatively coupled to the processor, wherein the memory stores processor-executable instructions, which, on execution, cause the processor to:
   detect presence of spectacles in the input image of the user;
   identify one or more readable and non-readable content available for display upon detection, the identifying comprises;
      classifying the content into one or more groups including text, images and icons;
      determining one or more geometrical characteristics of each group;
      comparing the one or more geometrical characteristics of each group with a predetermined threshold characteristic value, wherein the predetermined threshold characteristic value is based at least on the stored refractive index, and radii of curvature of the user; and
      identifying one or more readable and non-readable group of the content based on the comparison;
   determine refractive error correction factor for each of the non-readable content upon the identifying; and
   control display of the content based on at least the refractive error correction factor thus determined.

6. The system as claimed in claim 5, wherein the instructions, on execution, cause the processor to detect the presence of spectacles in the input image of the user by comparing the input image of the user with images of the user previously stored in the memory.

7. The system as claimed in claim 5, wherein the instructions, on execution, cause the processor to determine the refractive error correction factor for non-readable content by the steps of:
   calculating the difference between the one or more geometrical characteristics of each group of non-readable content with the predetermined threshold characteristics value;
   determining the refractive error correction factor for each group of non-readable content based on the calculated difference.

8. The system as claimed in claim 5, wherein the instructions, on execution, cause the processor to control the display of the content by performing the steps of:
   modifying the geometrical characteristics of each group of non-readable content based on the corresponding refractive error correction factor to generate one or more resized groups of non-readable content; and
   displaying the readable content and resized group of non-readable content to the user.

9. A non-transitory computer readable medium including instructions stored thereon that when processed by at least one processor cause a system to perform acts of:
   capturing an input image of the user;
   detecting presence of spectacles in the input image of the user;
   identifying one or more readable and non-readable content available for display upon detection, the identifying comprises;
      classifying the content into one or more groups including text, images and icons;
      determining one or more geometrical characteristics of each group;
      comparing the one or more geometrical characteristics of each group with a predetermined threshold characteristic value, wherein the predetermined threshold characteristic value is based at least on the stored refractive index, and radii of curvature of the user; and identifying one or more readable and non-readable group of the content based on the comparison;

determining refractive error correction factor for each of the non-readable content upon the identifying; and controlling display of the content based on at least the refractive error correction factor thus determined.

10. The medium as claimed in claim 9, wherein the instructions, on execution, cause the at least one processor to detect the presence of spectacles in the input image of the user by comparing the input image of the user with previously stored images of the user.

11. The medium as claimed in claim 9, wherein the instructions, on execution, cause the at least one processor to determine the refractive error correction factor for non-readable content by the steps of:

calculating the difference between the one or more geometrical characteristics of each group of non-readable content with the predetermined threshold characteristics value;

determining the refractive error correction factor for each group of non-readable content based on the calculated difference.

12. The medium as claimed in claim 9, wherein the instructions, on execution, cause the at least one processor to control the display of the content by performing the steps of:

modifying the geometrical characteristics of each group of non-readable content based on the corresponding refractive error correction factor to generate one or more resized groups of non-readable content; and displaying the readable content and resized group of non-readable content to the user.

* * * * *